(12) United States Patent
Kuo et al.

(10) Patent No.: US 8,084,960 B2
(45) Date of Patent: Dec. 27, 2011

(54) CIRCUITS AND METHODS FOR POWERING LIGHT SOURCE WITH BALANCED CURRENTS

(75) Inventors: Ching-Chuan Kuo, Taipei (TW); ShengTai Lee, Taipei (TW)

(73) Assignee: O2Micro, Inc, Santa Clara, CA (US)

(*) Notice: Subject to any disclaimer, the term of this patent is extended or adjusted under 35 U.S.C. 154(b) by 186 days.

(21) Appl. No.: 12/650,016

(22) Filed: Dec. 30, 2009

(65) Prior Publication Data
US 2011/0133645 A1 Jun. 9, 2011

(51) Int. Cl.
*G05F 1/00* (2006.01)

(52) U.S. Cl. ........ 315/297; 315/307; 315/294; 315/295; 315/301; 315/312; 315/128; 315/82

(58) Field of Classification Search ........ 315/77, 315/82, 83, 121–123, 128, 192, 224, 226, 315/291, 294, 297, 301, 307, 308, 312
See application file for complete search history.

(56) References Cited

U.S. PATENT DOCUMENTS

| | | | | |
|---|---|---|---|---|
| 7,906,913 B2 * | 3/2011 | Bouchard | ........................ | 315/82 |
| 7,969,097 B2 * | 6/2011 | Van De Ven | .................. | 315/112 |
| 7,994,725 B2 * | 8/2011 | Bouchard | ..................... | 315/122 |
| 2010/0164403 A1 * | 7/2010 | Liu | ............................... | 315/297 |

FOREIGN PATENT DOCUMENTS

| | | |
|---|---|---|
| CN | 101146387 A | 3/2008 |
| CN | 201119073 Y | 9/2008 |
| CN | 101521971 A | 9/2009 |
| CN | 201341255 Y | 11/2009 |

* cited by examiner

*Primary Examiner* — Haiss Philogene

(57) ABSTRACT

A light source driving circuit for powering multiple light sources in a vehicle includes multiple current limiters and a balance controller. The current limiters are coupled to the light sources for adjusting currents of the light sources respectively. The balance controller coupled to the current limiters can control the current limiters such that a current flowing through each of the light sources is substantially the same as a first target current. Moreover, the balance controller can control the current limiters in response to a brake of the vehicle such that a current flowing through each of the light sources is substantially the same as a second target current.

18 Claims, 6 Drawing Sheets

CIRCUITS AND METHODS FOR POWERING LIGHT SOURCE WITH BALANCED CURRENTS

BACKGROUND

In recent years, light sources such as light emitting diodes (LEDs) have been improved through technological advances in material and manufacturing processes. The LEDs possess characteristics such as a relatively high efficiency, a relatively long life, and vivid colors, and can be used in a variety of industries. One example is to use the LEDs to replace traditional incandescent bulbs in a vehicle lamp. LEDs present advantages over incandescent light bulbs including lower energy consumption, longer lifetime, improved robustness, smaller size, faster switching, and greater durability and reliance.

FIG. 1 shows a conventional LED driving circuit 100 for powering multiple LED strings in a vehicle tail light. LED strings 108_1, 108_2, ..., 108_N are powered by a DC power source 102, e.g., a battery. Each LED string can be coupled to ground through two resistors connected in parallel. For example. LED string 108_1 is coupled to ground through a resistor 112_1 and a resistor 114_1. The resistor 112_1 and the resistor 114_1 are connected in parallel. The resistor 114_1 is coupled to a switch 110_1 in series. In operation, if the switch 110_1 is turned off, a current flows through the LED string 108_1 and the resistor 112_1 to ground. When a driver applies the brake of the vehicle, a dimming signal ADJ turns on the switch 110_1 such that the total resistance of the parallel-connected resistor 112_1 and resistor 114_1 is less than the resistance of the resistor 112_1. Therefore, the current flowing through the LED string 108_1 increases and the brightness of the LED string 108_1 increases. Similarly, when the driver applies the brake of the vehicle, the dimming signal ADJ turns on the switch 110_2, ... 110_N such that the brightness of the LED strings 108_2, ... 108_N increases. One of the drawbacks of the conventional LED driving circuit 100 is that due to different forward voltages of the LED strings, different LED strings may have different currents, so that the brightness of each LED string may be different.

SUMMARY

A light source driving circuit for powering multiple light sources in a vehicle includes multiple current limiters and a balance controller. The current limiters are coupled to the light sources for adjusting currents of the light sources respectively. The balance controller coupled to the current limiters can control the current limiters such that a current flowing through each of the light sources is substantially the same as a first target current. Moreover, the balance controller can control the current limiters in response to a brake of the vehicle such that a current flowing through each of the light sources is substantially the same as a second target current.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a light source driving circuit for powering multiple light sources in a vehicle. In one embodiment, the light source driving circuit includes current limiters to adjust brightness of the light sources and a balance controller to balance currents flowing through the light sources. Advantageously, the currents through the light sources can be adjusted to be substantially the same such that all the light sources can emit relatively uniform brightness. Furthermore, the balance controller can monitor the light sources to determine if one or more light sources are in an abnormal or undesired condition, such as an open circuit condition or a short circuit condition. Advantageously, if one or more light sources are in an abnormal or undesired condition, the balance controller can selectively turn off those light sources in the abnormal or undesired condition when the balance controller works in a first shutdown mode. Alternatively, the balance controller can turn off all the light sources if at least one light source is in an abnormal or undesired condition when the balance controller works in a second shutdown mode. Furthermore, if the light source driving circuit includes multiple balance controllers, other balance controllers can be informed if a balance controller detects an abnormal or undesired condition. The light source driving circuit in the present invention can be used to control various light sources in various applications.

Figure 1:
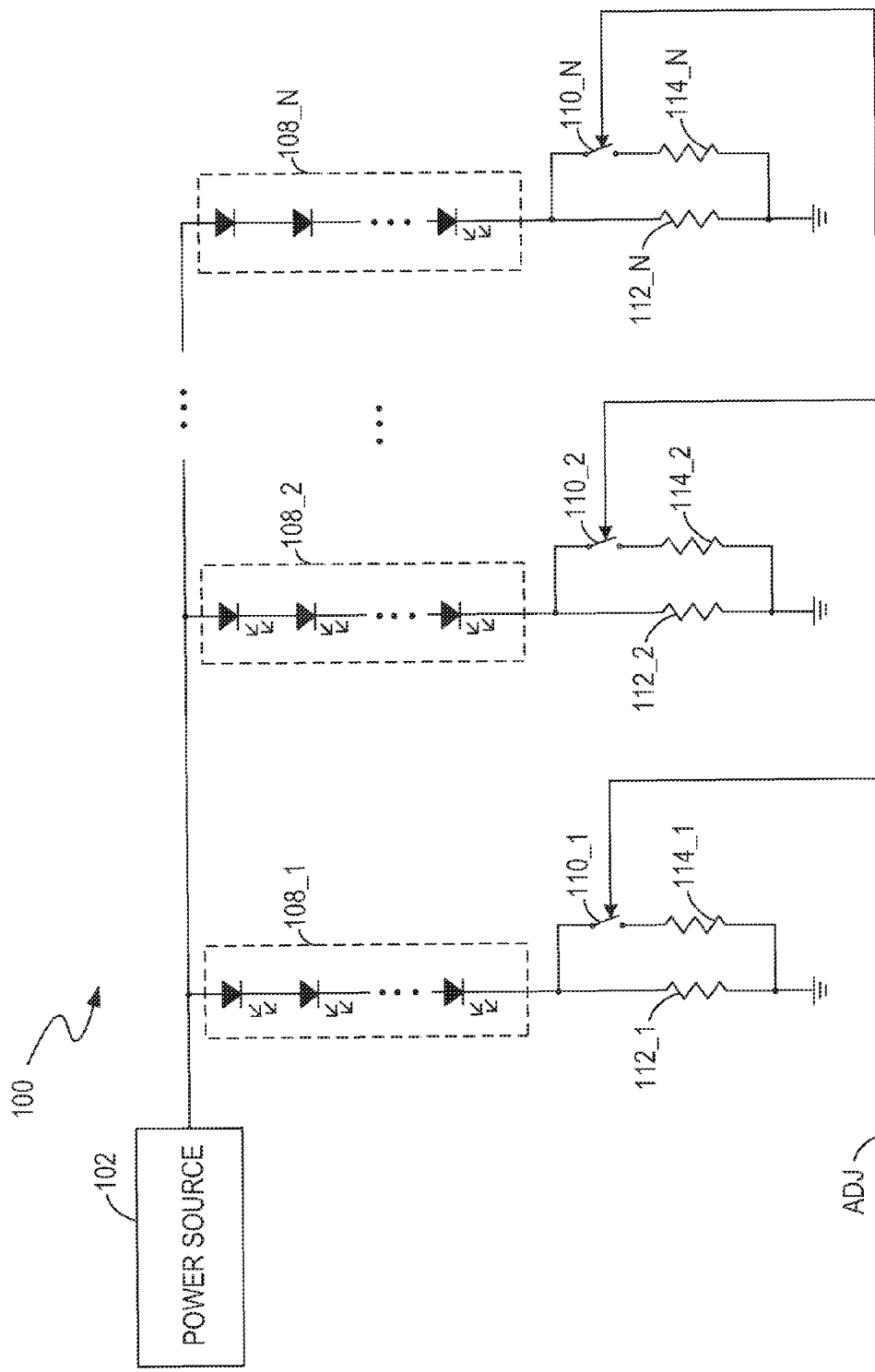
FIG. 1 shows a conventional driving circuit for powering multiple LED strings in a vehicle.
Figure 2:
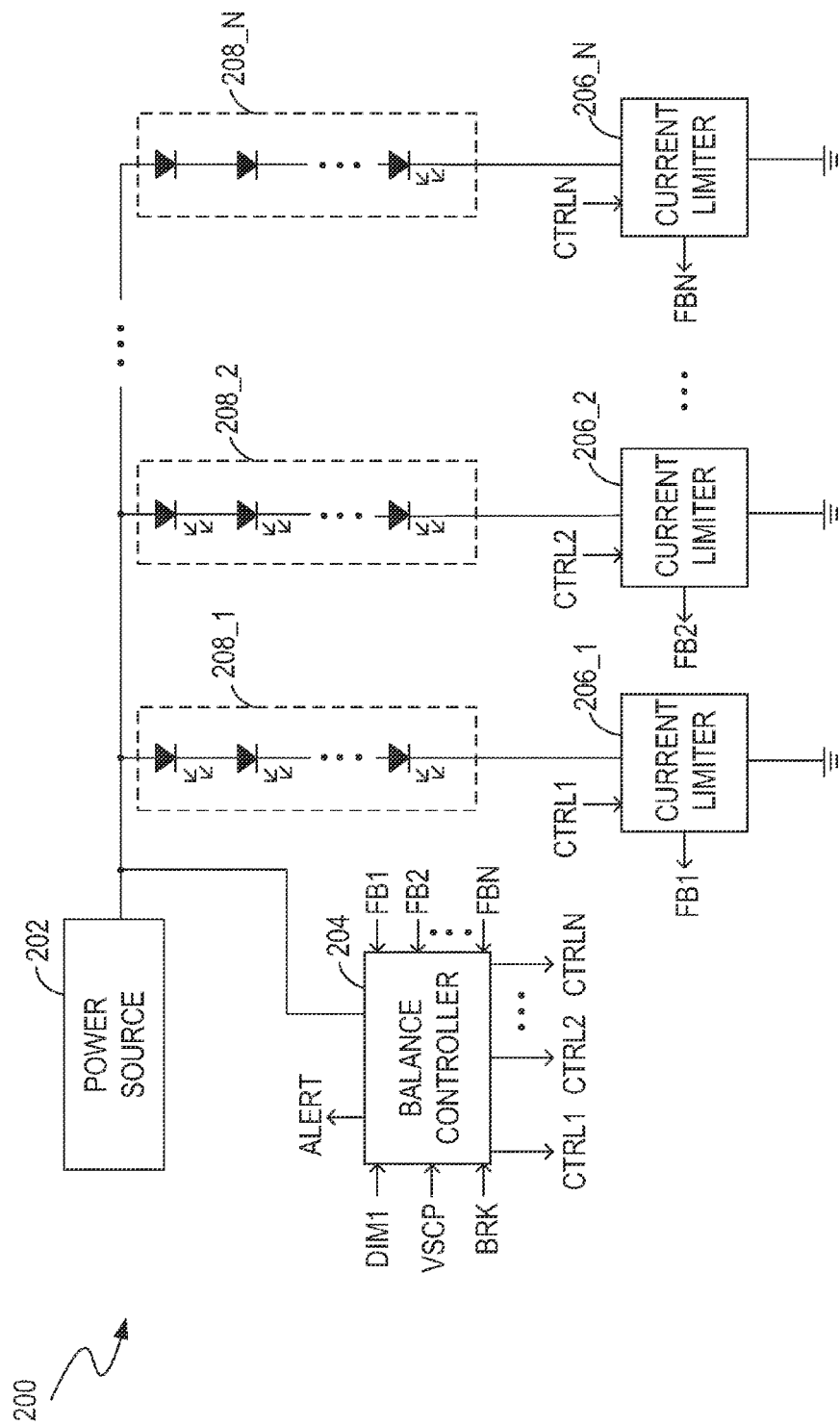
FIG. 2 shows a light source driving circuit for powering multiple light sources in a vehicle, in accordance with one embodiment of the present invention.

FIG. 2 shows a light source driving circuit 200 for powering multiple light sources, e.g., light sources in a vehicle, in accordance with one embodiment of the present invention. In the example in FIG. 2, the light sources can be LED strings 208_1, 208_2, ... 208_N. Multiple current limiters 206_1, 206_2, ... 206_N are coupled to the LED strings 208_1, 208_2, ... 208_N respectively for adjusting currents through the LED strings 208_1, 208_2, ... 208_N. A balance controller 204 is coupled to the current limiters 206_1, 206_2, ... 206_N for controlling the current limiters 206_1, 206_2 ... 206_N to balance the currents through the LED strings 208_1, 208_2, ... 208_N. The balance controller 204 can also monitor each LED string to determine if one or more LED strings are in an abnormal or undesired condition, such as an open circuit condition or a short circuit condition.

In operation, each current limiter 206_1, 206_2, ... 206_N can generate a feedback signal FB1, FB2, ... FBN which can indicate a current flowing through a corresponding LED string 208_1, 208_2, ... 208_N. The balance controller 204 can generate control signals CTRL1, CTRL2, ... CTRLN to control the current limiters 206_1, 206_2, ... 206_N respectively to balance the currents through the LED strings such that the currents through the LED string 208_1, 208_2, ... 208_N can be substantially the same.

In one embodiment, the balance controller 204 can adjust the brightness of the LED strings 208_1, 208_2, ... 208_N in response to a brake of the vehicle. More specifically, If the driver does not apply the brake of the vehicle, the balance controller 204 can control the current limiters 206_1, 206_2, ... 206_N respectively such that a current through each LED string 208_1, 208_2, ... 208_N is substantially the same as a first target current. As used herein, "substantially the same as a first target current" means that one or more currents through the corresponding LED strings may be slightly different from the first target current due to the non-ideality of the circuit components, but within a range such that all the LED strings can emit relatively uniform brightness. The first target current can be determined by a first reference signal DIM1. In one embodiment, the first reference signal DIM1 is an external signal received by the balance controller 204. If the driver applies the brake of the vehicle, the balance controller 204 can control the current limiters 206_1, 206_2, ... 206_N respectively such that a current through each LED string 208_1, 208_2, ... 208_N is substantially the same as a second target current that is greater than the first target current. As used herein, "substantially the same as a second target current" means that one or more currents through the corresponding LED strings may be slightly different from the second target current due to the non-ideality of the circuit components, but within a range such that all the LED strings can emit relatively uniform brightness. The second target current can be determined by a second reference signal DIM2. In one embodiment, the second reference signal DIM2 is a local signal generated within the balance controller 204. If the brake is released, the balance controller 204 can control the current limiters 206_1, 206_2, ... 206_N respectively such that a current through each LED string 208_1, 2, ... 208_N is substantially the same as the first target current. In one embodiment, the balance controller 204 can detect whether a brake is applied by monitoring a voltage of a brake signal BRK. The brake signal BRK can be generated by a micro controller in the vehicle.

In one embodiment, the balance controller 204 can determine that an LED string is in an open circuit condition if a current of the LED string is less than a predetermined current. More specifically, the balance controller 204 can determine if one or more LED strings are in an open circuit condition by comparing the feedback signals FB1, FB2, ... FBN to an open circuit protection threshold VOCP. The open circuit protection threshold VOCP can indicate a predetermined current threshold to perform open circuit protection. The open circuit protection threshold VOCP can be generated by the balance controller 204 or predetermined.

During operation of the light source driving circuit 200, the control signals CTRL1, CTRL2, ... CTRLN can change in response to the feedback signals FB1 FB2, ... FBN to adjust the currents of the LED strings 208_1, 208_2 ... 208_N respectively. Therefore, the control signals CTRL1, CTRL2, ... CTRLN can indicate currents of the LED strings 208_1, 208_2 ... 208_N respectively. In one embodiment, the balance controller 204 can determine that an LED string is in a short circuit condition if a voltage of a corresponding control signal is greater than a predetermined voltage. More specifically, the balance controller 204 can determine if one or more LED strings are in a short circuit condition by comparing the control signals CTRL1, CTRL2, ... CTRLN to a short circuit protection threshold VSCP. The short circuit protection threshold VSCP can indicate a predetermined voltage threshold to perform short circuit protection.

In one embodiment, the balance controller 204 can generate an alert signal EN having a first level (e.g. the alert signal EN is logic 0) if one or more LED string are in an abnormal or undesired condition such as an open circuit condition or a short circuit condition. If no abnormal or undesired condition is detected by the balance controller 204, the balance controller 204 can generate an alert signal EN having a second level (e.g., the alert signal EN is logic 1).

Figure 3:
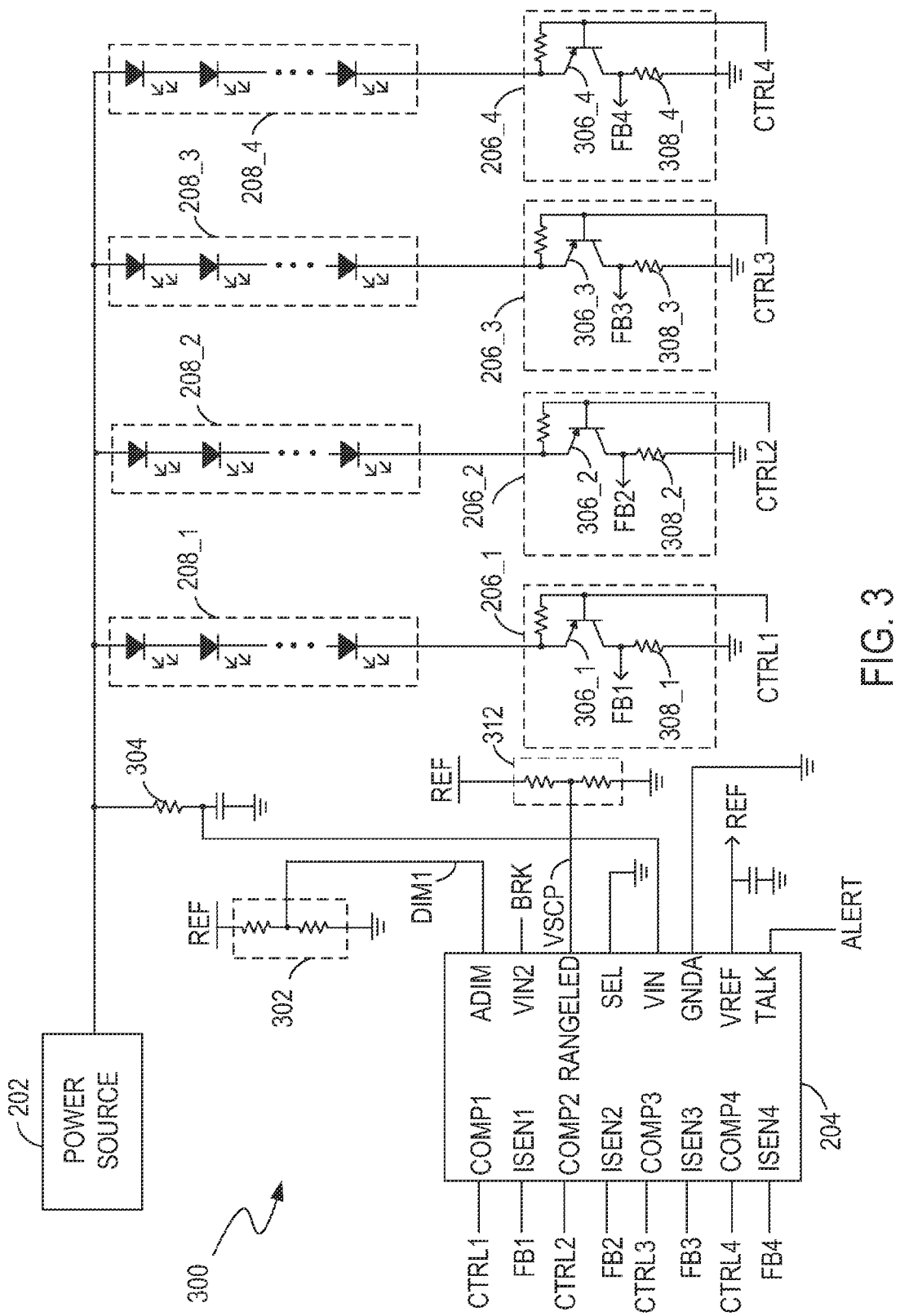
FIG. 3 shows a light source driving circuit for powering multiple light sources in a vehicle, in accordance with one embodiment of the present invention.

FIG. 3 shows a light source driving circuit 300 for powering multiple light sources in a vehicle, in accordance with one embodiment of the present invention. Elements labeled the same as in FIG. 2 have similar functions. FIG. 3 is described in combination with FIG. 2. In the example of FIG. 3, four LED strings 208_1, 208_2, 208_3 and 208_4 are powered by the light source driving circuit 300. However, other number of the LED strings can be included in the LED driving circuit 300.

In the example in FIG. 3, each of the current limiters 206_1, 206_2, 206_3 and 206_4 can include a switch, e.g., a PNP bipolar junction transistor 306_1, 306_2, 306_3 and 306_4, coupled in series with a corresponding LED string. Each of the current limiters 206_1, 206_2, 206_3 and 206_4 can further include a current sensor, e.g., a resistor 308_1, 308_2, 308_3 and 308_4, coupled in series with a corresponding LED string. The resistors 308_1, 308_2, 308_3 and 308_4 can provide feedback signals FB1, FB2, FB3 and FB4 indicative of currents flowing through the LED strings 208_1, 208_2, 208_3 and 208_4 respectively. A balance controller 204 can receive the feedback signals FB1 FB2, FB3 and FB4 and can generate control signals CTRL1, CTRL2, CTRL3 and CTRL4 to control the currents flowing through the LED strings 208_1, 208_2, 208_3 and 208_4 respectively by controlling conductance status of the transistors 306_1, 306_2, 306_3 and 306_4. In one embodiment, the control signals CTRL1. CTRL2, CTRL3 and CTRL4 are coupled to bases of the transistors 306_1, 306_2, 306_3 and 306_4 respectively.

In one embodiment, the balance controller 204 can have output terminals COMP1, COMP2, COMP3 and COMP4 for outputting control signals CTRL1, CTRL2, CTRL3 and CTRL4 to control the transistors 306_1, 306_2, 306_3 and 306_4 respectively, and can have an output terminal VREF for outputting a reference voltage signal REF. The balance controller 204 can have input terminals ISEN1, ISEN2, ISEN3, ISEN4, ADIM, VIN2, RENGELED and VIN. The terminals ISEN1, ISEN2, ISEN3 and ISEN4 are coupled to the resistors 308_1, 308_2, 308_3 and 308_4 respectively for receiving feedback signals FB1, FB2. FB3 and FB4 from the resistors 308_1, 308_2, 308_3 and 308_4. The terminal ADIM is coupled to the reference voltage signal REF through a voltage divider 302 for receiving the reference signal DIM1. The first reference signal DIM1 can indicate a first target current. The terminal VIN2 can receive a brake signal BRK which can indicate an operation of a brake of the vehicle. The terminal RENGELED is coupled to the reference voltage signal REF through a voltage divider 312 for receiving the short circuit protection threshold VSCP. The short circuit protection threshold VSCP can indicate a threshold to perform short circuit protection. The terminal VIN is coupled to the power source 202 through a resistor 304 for receiving input power from the power source 202. The balance controller 204 can also have an input terminal SEL for determining a shutdown mode, a terminal GNDA coupled to ground, and a terminal TALK for outputting an alert signal EN which can indicate whether one or more LED strings coupled to the balance controller 204 are in an abnormal or undesired condition such as an open circuit condition or a short circuit condition.

Figure 4:
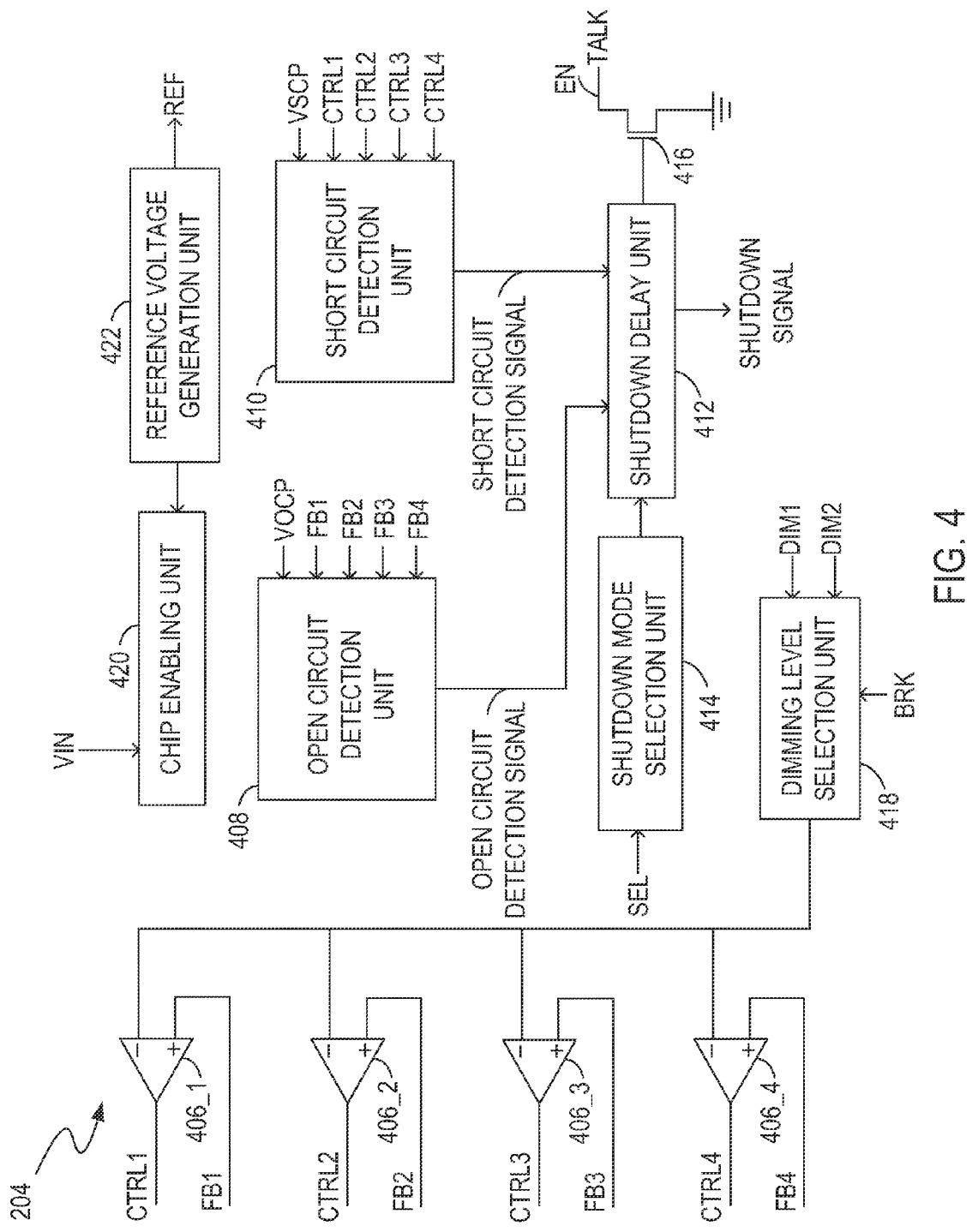
FIG. 4 shows an example of the balance controller in FIG. 3.

FIG. 4 shows an example of the balance controller 204 in FIG. 3. FIG. 4 is described in combination with FIG. 2 and FIG. 3. In one embodiment, the balance controller 204 can include a dimming level selection unit 418, operational amplifiers 406_1, 406_2, 406_3 and 406_4, a chip enabling unit 420, a reference voltage generation unit 422 for generating the reference voltage signal REF, an open circuit detection unit 408, a short circuit detection unit 410, a shutdown delay unit 412, and a shutdown mode selection unit 414.

The chip enabling unit 420 can receive power from the terminal VIN, and can enable the balance controller 204 if the voltage at the terminal VIN is greater than a predetermined startup voltage, e.g., 4.5V. The chip enabling unit 420 can disable the balance controller 204 if the voltage at the terminal VIN is less than a predetermined shutdown voltage, e.g., 4V.

The shutdown mode selection unit 414 can determine a shutdown mode based on a voltage at the terminal SEL. In one embodiment, users can determine a shutdown mode of the balance controller 204 by selectively coupling the terminal SEL to a power source or to ground. In one embodiment, if the terminal SEL is coupled to the power source and the voltage at the terminal SEL is greater than a first predetermined voltage, e.g., 2V, the shutdown mode selection unit 414 selects a first shutdown mode. In the first shutdown mode, the balance controller 204 selectively turns off one or more LED strings which are in an abnormal or undesired condition. In one embodiment, if the terminal SEL is coupled to ground and the voltage at the terminal SEL is less than a second predetermined voltage, e.g., 0.8V, the shutdown mode selection unit 414 selects a second shutdown mode. In the second shutdown mode, the balance controller 204 turns off all of the LED strings 208_1, 208_2, 208_3 and 208_4 if at least one LED string is in an abnormal or undesired condition.

The dimming level selection unit 418 can select a reference signal from the first reference signal DIM1 and the second reference signal DIM2 in response to a brake of the vehicle. In one embodiment, if the driver does not apply the brake, the brake signal BRK is logic 0 and the dimming level selection unit 418 selects the first reference signal DIM1. In one embodiment, if the driver applies the brake, the brake signal BRK is logic 1 and the dimming level selection unit 418 selects the second reference signal DIM2. If the driver releases the brake, the brake signal BRK returns to logic 0 and the dimming level selection unit 418 selects the first reference signal DIM1. The selected reference signal is applied to inverting inputs of the operational amplifiers 406_1, 406_2, 406_3 and 406_4. The feedback signals FB1, FB2, FB3 and FB4 are applied to the non-inverting inputs of the operational amplifiers 406_1, 406_2, 406_3 and 406_4 respectively.

In operation, if the first reference signal DIM1 is selected, amplifiers 406_1, 406_2, 406_3 and 406_4 can generate control signals CTRL1, CTRL2, CTRL3 and CTRL4 to control conductance status of the transistors 306_1, 306_2, 306_3 and 306_4 respectively such that voltages of the feedback signals FB1, FB2, FB3 and FB4 can be substantially the same as the voltage of the first reference signal DIM1. Consequently, currents of the LED strings 208_1, 208_2, 208_3 and 208_4 can be substantially the same as the first target current. Similarly, if the second reference signal DIM2 is selected, currents flowing though the LED strings 208_1, 208_2, 208_3 and 208_4 can be adjusted respectively to be substantially the same as the second target current.

The open circuit detection unit 408 can determine if one or more LED strings are in an open circuit condition by comparing the feedback signals FB1, FB2, FB3 and FB4 to the open circuit protection threshold VOCP. The open circuit detection unit 408 detects an open circuit condition of an LED string if the voltage of the corresponding feedback signal is less than the open circuit protection threshold VOCP. For example, if the LED string 208_1 is open, the current flowing through the LED string 208_1 is cut off, so that the voltage of the feedback signal FB1 is zero which is less than the open circuit protection threshold VOCP. The open circuit detection unit 408 can generate an open circuit detection signal indicating that the LED string 208_1 is in an open circuit condition.

The short circuit detection unit 410 can determine if one or more LED strings are in a short circuit condition by comparing the control signals CTRL1, CTRL2, CTRL3 and CTRL4 to the short circuit protection threshold VSCP. The short circuit detection unit 410 detects a short circuit condition of an LED string if the voltage of the corresponding control signal is greater than the short circuit protection threshold VSCP. In operation, if one or more LEDs in the LED string 208_1 are shorted, the voltage of the control signal CTRL1 can be increased to maintain the current of the LED string 208_1 substantially the same as the currents of other LED strings. If the voltage of the control signal CTRL1 is greater than the short circuit protection threshold VSCP, the short circuit detection unit 410 can generate a short circuit detection signal indicating that the LED string 208_1 is in a short circuit condition.

The open circuit detection signal and the short circuit detection signal are forwarded to the shutdown delay unit 412. The shutdown delay unit 412 can generate a shutdown signal if an open circuit condition or a short circuit condition lasts beyond a predetermined time period. The shutdown delay unit 412 can be utilized to improve accuracy of the detection of an abnormal or undesired condition. For example, the open circuit detection unit 408 may generate an open circuit detection signal due to a bad contact of the circuit. The short circuit detection unit 410 may generate a short circuit detection signal in response to a spike of an input voltage. If these abnormal or undesired conditions go away before the predetermined time period expires, the shutdown delay unit 412 will not generate a shutdown signal, in one embodiment.

If the shutdown mode selection unit 414 selects a first shutdown mode, the balance controller 204 turns off one or more LED strings which are in an abnormal or undesired condition in response to the shutdown signal. If the shutdown mode selection unit 414 selects a second shutdown mode, the balance controller 204 turns off all LED strings 208_1, 208_2, 208_3 and 208_4 in response to the shutdown signal if at feast one LED string is in an abnormal or undesired condition. In one embodiment, the balance controller 204 can turn off an LED string by increasing a voltage of a corresponding control signal to a predetermined level. For example, the balance controller 204 can turn off the LED string 208_1 by increasing the voltage of the control signal CTRL1 to the predetermined level.

In one embodiment, the shutdown delay unit 412 can also control a switch 416 coupled between the terminal TALK and ground so as to control a level of the alert signal EN. In one embodiment, the terminal TALK is coupled to a voltage source (shown in FIG. 5). If an open circuit condition or a short circuit condition lasts beyond the predetermined time period, the shutdown delay unit 412 can turn on the switch 416 such that the voltage of the alert signal EN (the voltage at the terminal TALK) has a first level, e.g., EN is logic 0. Otherwise, the shutdown delay unit 412 can turn off the switch 416 such that the alert signal EN has a second level, e.g., EN is logic 1. The alert signal EN can inform users or other modules in the driving circuit whether an abnormal or undesired condition is detected by the balance controller 204.

Figure 5:
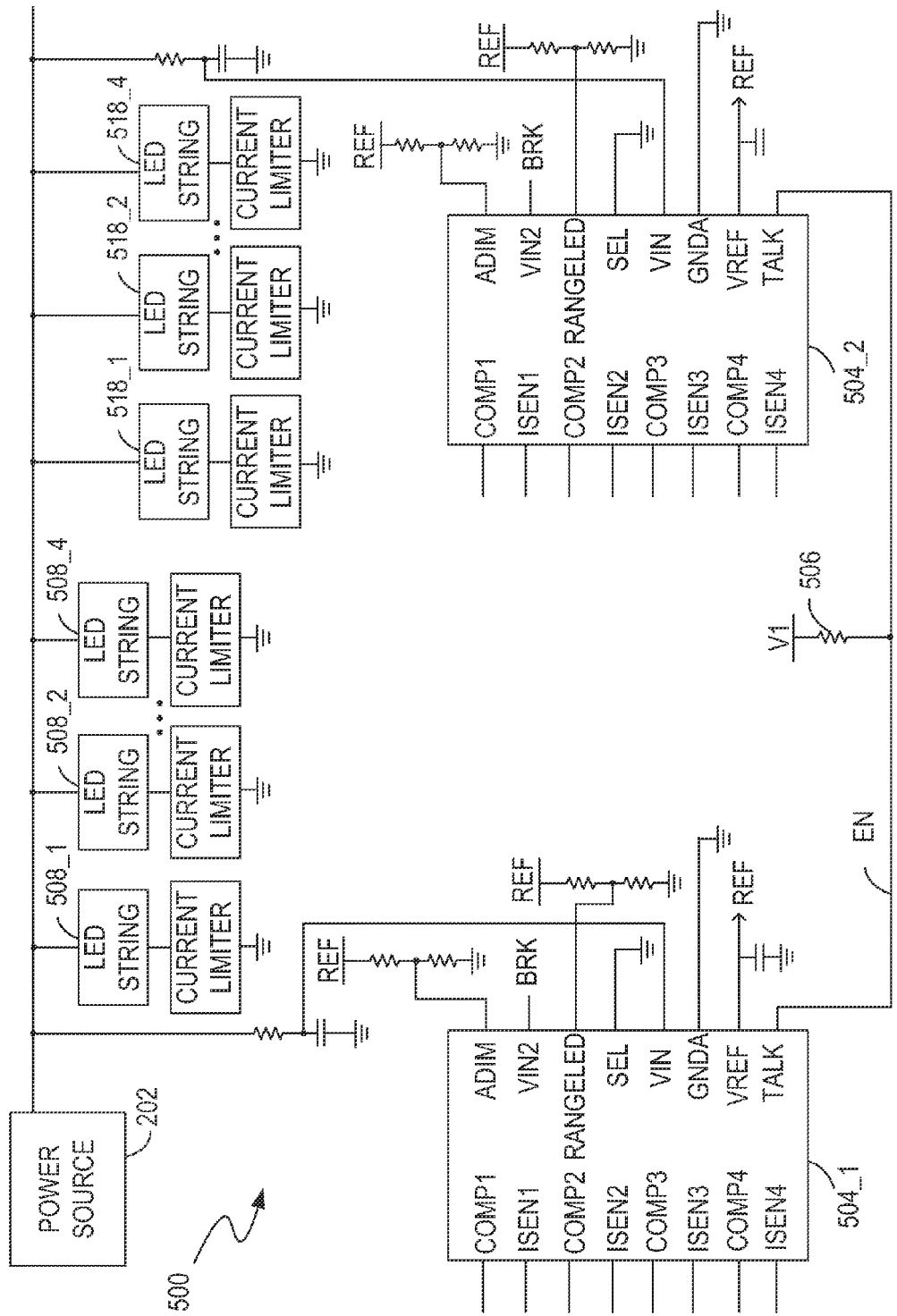
FIG. 5 shows a light source driving circuit for powering multiple light sources in a vehicle, in accordance with one embodiment of the present invention.

FIG. 5 shows a light source driving circuit 500 for powering multiple light sources in a vehicle, in accordance with one embodiment of the present invention. FIG. 5 is described in combination with FIG. 4. In the example of FIG. 5, the light source driving circuit 500 includes a first balance controller 504_1 and a second balance controller 504_2. A first set of LED strings 508_1, 508_2, . . . 508_4 are connected to the first balance controller 504_1. A second set of LED strings 518_1, 518_2, . . . 518_4 are connected to the second balance controller 504_2. The terminal TALK of the first balance controller 504_1 is connected with the terminal TALK of the second balance controller 504_2. Both of these terminals are connected to a voltage source V1 through a resistor 506. In the example of FIG. 5, four LED strings 508_1, 508_2, . . . 508_4 are connected to the first balance controller 504_1, four LED strings 518_1, 518_2, . . . 518_4 are connected to the second balance controller 504_2. However, other number of the LED strings can be included in the LED driving circuit 500.

In operation, if one or more LED strings coupled to the balance controller 504_1 are detected in an abnormal condition or undesired condition, the first balance controller 504_1 can inform the second balance controller 504_2 via the terminal TALK, and vise versa. For example, if no abnormal or undesired condition is detected by the first balance controller 504_1, the shutdown delay unit 412 of the first balance controller 504_1 turns off the switch 416 in the first balance controller 504_1. Similarly, if no abnormal or undesired condition is detected by the second balance controller 504_2, the shutdown delay unit 412 of the second balance controller 504_2 turns off the switch 416 in the second balance controller 504_2. As a result, the terminal TALK of the first balance controller 504_1 and the terminal TALK of the second balance controller 504_2 are both coupled to the voltage source V1 through the resistor 506. Therefore, the alert signal EN is logic 1. If one or more LED string are detected to be in an abnormal or undesired condition by the first balance controller 504_1, and the abnormal or undesired condition lasts beyond the predetermined time period, the shutdown delay unit 412 of the first balance controller 504_1 turns on the switch 416 in the first balance controller 504_1 such that the terminal TALK of the first balance controller 504_1 and the terminal TALK of the second balance controller 504_2 are both coupled to ground. Therefore, the alert signal EN is logic 0. Thus, the second balance controller 504_2 can be informed of the abnormal or undesired condition occurred in the LED strings coupled to the first balance controller 504_1 if the alert signal EN is logic 0. In one embodiment, the first set of LED strings 508_1, 508_2, . . . 508_4 and the second set of LED strings 518_1, 518_2, . . . 518_4 are all turned off by the first balance controller 504_1 and the second balance controller 504_2 respectively if the alert signal EN is logic 0.

Figure 6:
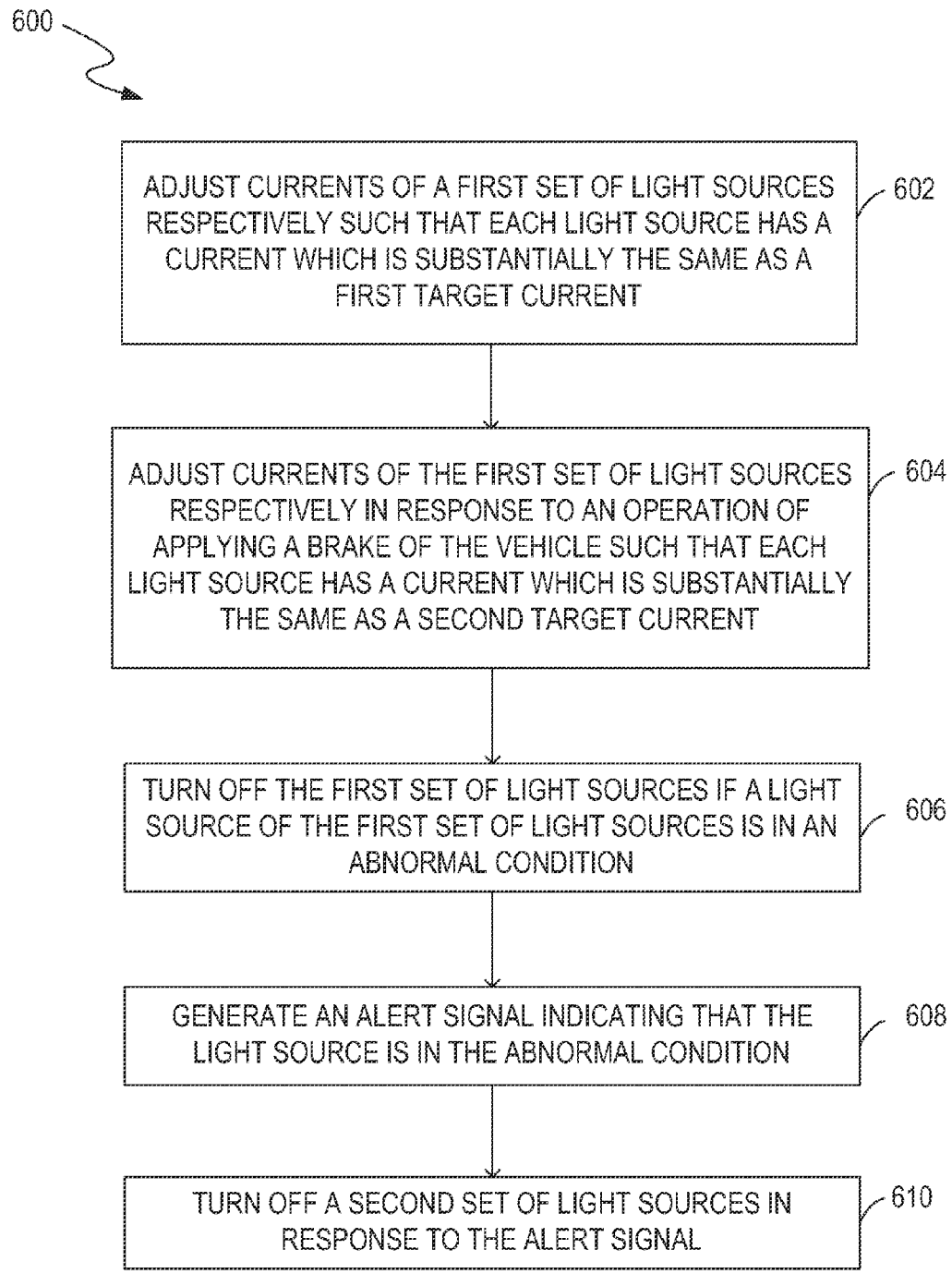
FIG. 6 shows a flowchart of a method for powering multiple light sources in a vehicle, according to one embodiment of the present invention.

FIG. 6 shows a flowchart of a method for powering multiple light sources in a vehicle, according to one embodiment of the present invention. FIG. 6 is described in combination with FIG. 5.

In block 602, currents of a first set of light sources are adjusted respectively, e.g., by a first balance controller 504_1 such that a current flowing through each light source is substantially the same as a first target current.

In block 604, if a driver applies a brake of the vehicle, the currents of the first set of light sources are adjusted respectively, e.g., by the first balance controller 504_1 such that a current through each light source is substantially the same as a second target current.

In block 606, the first set of light sources are turned off if one or more light sources are in an abnormal or undesired condition. In one embodiment, an abnormal condition comprises an open circuit condition. In one embodiment, a light source can be determined to be in an open circuit condition if a current of the light source is less than a predetermined current. In one embodiment, an abnormal condition comprises a short circuit condition. In one embodiment, the currents of the first set of light sources are adjusted by multiple control signals respectively, and a light source can be determined to be in a short circuit condition if a voltage of a corresponding control signal is greater than a predetermined voltage.

In block 608, an alert signal is generated, e.g. by the first balance controller 504_1. The alert signal can indicate that one or more light sources of the first set of light sources are in the abnormal or undesired condition. In block 610, a second set of light sources are turned off in response to the alert signal, e.g., the second set of light sources are turned off by a second balance controller 504_2.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A light emitting diode (LED) driving circuit for powering a plurality of LED strings in a vehicle, said LED driving circuit comprising:
    a plurality of current limiters coupled to said LED strings for adjusting currents of said LED strings respectively;
    a balance controller coupled to said current limiters, and operable for controlling said current limiters such that a current flowing through each of said LED strings is substantially the same as a first target current, and operable for controlling said current limiters in response to a brake of said vehicle such that said current flowing through each of said LED strings is substantially the same as a second target current.

2. The LED driving circuit of claim 1, wherein each of said current limiters comprises a current sensor for providing a feedback signal indicating a current of a corresponding LED string to said balance controller.

3. The LED driving circuit of claim 1, wherein said balance controller is operable for determining that an LED string is in an open circuit condition if a current of said LED string is less than a predetermined current.

4. The LED driving circuit of claim 1, wherein said balance controller is operable for generating a plurality of control signals to control said current limiters respectively, and is operable for determining that an LED string is in a short circuit condition if a voltage of a corresponding control signal is greater than a predetermined voltage.

5. The LED driving circuit of claim 1, wherein said balance controller comprises a shutdown mode selection unit operable for selecting a first shutdown mode and a second shutdown mode, wherein in said first shutdown mode said balance controller is operable for turning off an LED string if said LED string is in an abnormal condition, and wherein in said second shutdown mode said balance controller is operable for turning off all said LED strings if at least one LED string is in said abnormal condition.

6. The LED driving circuit of claim 1, wherein said balance controller comprises a dimming level selection unit operable for selecting a reference signal from a first reference signal and a second reference signal in response to said brake of said vehicle, and wherein said first reference signal indicates said first target current and said second reference signal indicates said second target current.

7. A light emitting diode (LED) driving circuit for powering a first plurality of LED strings and a second plurality of LED strings, said LED driving circuit comprising:
a first balance controller coupled to said first plurality of LED strings and operable for adjusting currents of said first plurality of LED strings such that a current flowing through each LED string of said first plurality of LED strings is substantially the same as a first target current, and
a second balance controller coupled to said second plurality of LED strings and operable for adjusting currents of said second plurality of LED strings such that a current flowing through each LED string of said second plurality of LED strings is substantially the same as said first target current,
wherein said first balance controller is operable for informing said second balance controller if an LED string of said first plurality of LED strings is in an abnormal condition.

8. The LED driving circuit of claim 7, wherein said first balance controller is operable for adjusting said currents of said first plurality of LED strings in response to a brake of a vehicle such that said current flowing through each LED string of said first plurality of LED strings is substantially the same as a second target current, and wherein said second balance controller is operable for adjusting said currents of said second plurality of LED strings in response to said brake of said vehicle such that said current flowing through each LED string of said second plurality of LED strings is substantially the same as said second target current.

9. The LED driving circuit of claim 7, wherein said first balance controller is operable for turning off said first plurality of LED strings if said LED string is in said abnormal condition, and wherein said second balance controller is operable for turning off said second plurality of LED strings if said LED string is in said abnormal condition.

10. The LED driving circuit of claim 7, wherein said abnormal condition comprises an open circuit condition.

11. The LED driving circuit of claim 10, wherein said first balance controller is operable for determining that said LED string is in said open circuit condition if a current of said LED string is less than a predetermined current.

12. The LED driving circuit of claim 7, wherein said abnormal condition comprises a short circuit condition.

13. The LED driving circuit of claim 12, wherein said first balance controller is operable for generating a plurality of control signals to control said currents of said first plurality of LED strings respectively, and is operable for determining that said LED string is in said short circuit condition if a voltage of a corresponding control signal for controlling a current of said LED string is greater than a predetermined voltage.

14. A method for powering a first plurality of light emitting diode (LED) strings and a second plurality of LED strings in a vehicle, said method comprising:
adjusting currents of said first plurality of LED strings respectively such that a current flowing through each LED string of said first plurality of LED strings is substantially the same as a first target current;
adjusting said currents of said first plurality of LED strings respectively in response to a brake of said vehicle such that said current flowing through each LED string of said first plurality of LED strings is substantially the same as a second target current;
turning off said first plurality of LED strings if an LED string of said first plurality of LED strings is in an abnormal condition;
generating an alert signal indicating that said LED string is in said abnormal condition; and
turning off said second plurality of LED strings in response to said alert signal.

15. The method of claim 14, wherein said abnormal condition comprises an open circuit condition.

16. The method of claim 15, further comprising:
determining that said LED string is in said open circuit condition if a current of said LED string is less than a predetermined current.

17. The method of claim 14, wherein said abnormal condition comprises a short circuit condition.

18. The method of claim 17, further comprising:
controlling said currents of said first plurality of LED strings by a plurality of control signals respectively; and
determining that said LED string is in said short circuit condition if a voltage of a corresponding control signal for controlling a current of said LED string is greater than a predetermined voltage.

* * * * *